United States Patent [19]
Miler et al.

[11] 3,903,267
[45] Sept. 2, 1975

[54] AROMATIZING AND/OR ANTISEPTIC AND/OR OXIDATION INHIBITING AGENT AS WELL AS METHOD OF PRODUCING AND APPLYING THE AGENT

[75] Inventors: Kazimierz B. M. Miler; Zbigniew P. Kozlowski, both of Warsaw, Poland

[73] Assignee: Instytut Przemyslu Miesnego, Warsaw, Poland

[22] Filed: July 1, 1970

[21] Appl. No.: 51,668

[30] Foreign Application Priority Data
July 1, 1969 Poland ................................. 134539

[52] U.S. Cl. .............................................. 424/195
[51] Int. Cl.² ......................................... A61K 27/00
[58] Field of Search ................ 424/195; 201/29, 30; 99/229

[56] References Cited
UNITED STATES PATENTS

| | | | |
|---|---|---|---|
| 1,884,241 | 10/1932 | Ricard et al. | 99/229 |
| 2,454,649 | 11/1948 | Guinot | 99/229 |
| 3,106,473 | 10/1963 | Hollenbeck | 99/229 |
| 3,152,914 | 10/1964 | Taylor | 99/229 |
| 3,445,248 | 5/1969 | Miler et al. | 99/229 |

Primary Examiner—Frederick E. Waddell
Attorney, Agent, or Firm—Waters, Schwartz & Nissen

[57] ABSTRACT

An agent and a method for producing an agent utilized as an additive to foodstuffs or the like for imparting thereto a smoked taste while concurrently improving their physical properties and forming an antiseptic or anti-oxidant. The method of producing the agent comprises the destructive distillation of a cellulosic or lignitic material, preferably deciduous tree wood and/or conifers or peat.

14 Claims, No Drawings

AROMATIZING AND/OR ANTISEPTIC AND/OR OXIDATION INHIBITING AGENT AS WELL AS METHOD OF PRODUCING AND APPLYING THE AGENT

The invention relates to an agent which when added to various products, especially articles of food, animal feed etc. imparts to them features of smoked products, improves their taste and smell properties and/or acts antiseptically and/or inhibits oxidation. The invention comprises also a method of producing and applying this agent.

The widely used impartation of smoked meat features to articles of food by subjecting these products to the action of curing-smoke existing in an aerosol state, is known. The transfer of smoke components into the products is effected on the principle of diffusion in plants called draft smoking-chambers. Sometimes smoke depositing on the products under the action of electrostatic forces is also used.

It is true that the direct action of the smoke onto the products imparts to them a typical desired smoked product aroma, but this method is very uneconomical and a particular disadvantage is the fact that it gives products contaminated by ballast and harmful smoke components, including by carcinogenic polycyclic hydrocarbons. This disadvantage is still more noticeable in case of depositing smoke-components onto the products under the influence of electrostatic forces.

The smoking of products by adding to them smoking preparations, for the most part obtained from products of the destructive distillation of wood or cognate raw-materials, has recently also been used.

All preparations obtained by destructive wood-distillation conducted without air access, exhibit, however, sensorial features considerably differing from the typical smoked-product aroma. From among known methods of obtaining such preparations, only the method stated in Polish Patent Specifications No. 49216 and No. 52159 provides the possibility of producing a preparation imparting to products the taste and smell features which are proper to typical smoked products. Disadvantage of this method is however the relatively low yield of the preparation amounting to about 20% by weight of all valuable smoke-components, and apart from this, the method of isolating the smoke-components makes it difficult to control the yield and quality of the final product.

Known methods of sterilizing articles of food, animal feed and similar products consist in utilizing physical factors such as elevated temperature, dehydration, action of ultra-violet and ionizing radiation, ultrasonic action, or in using chemical means of antiseptic or anitbiotic action. From among the numerous groups of known antiseptics and antibiotics used as additives to articles of food, food stuffs and similar products, only a small number of them are suitable, but none of them affords the possibility for simultaneously aromatizing or improving the sensorial features of the products. Such properties are likewise not exhibited by the above mentioned physical factors. Such cumulated action is exhibited only by some smoke-components, but up to now a method of isolating the same was not known.

Antioxidant action is shown by compounds which are capable of active interception of radicals or activation energy and thereby breaking definite links of the chain of autooxidation processes. Such known antioxidants are e.g. nordihydroguaiaretic acid, butyl hydroxyanisole, butyl hydroxytoluene, gallic acid etc. None of these agents is capable of aromatizing the products and improving their taste and smell features, nor do they possess antiseptic properties. Compounds distinguishing themselves by a combination of these features have been found in the curing-smoke, but a method of isolating them from the smoke was not yet known.

The invention affords the possibility for producing an agent which, when added to articles of food, animal feed and similar products, acts simultaneously aromatizingly, antiseptically and antioxidizingly. Depending on the expected application of said agent, according to the invention it is also possible to expose any of these features. The agent according to the invention is free from ballast compounds and is deprived entirely of carcinogenic polycyclic hydrocarbons which are present in every wood smoke, and tests have proved that the agent has no mutagenic toxic properties. Apart from this, it has been found that this agent, when applied to animal feed, causes in the unit of time a greater increase of the weight than feed with known additives, and improves the quality of furs of fur-bearing animals. The agent according to the invention is also a stimulator of taste and smell of articles of food, and when used even in subthreshold doses it acts as taste and/or smell synergent giving rise to a better occurence of advantageous and/or typical taste and smell features of products. When added to articles of food, feed and similar products, the agent according to the invention inhibits and/or holds back the growth of microorganisms and-/or decreases their number, reduces their development capability and/or weakens their resistance against the action of other known physical or chemical means acting or lethally on microorganisms.

The agent according to the invention is produced by a method in which any cellulosic and/or lignin material, preferably wood of deciduous trees and/or conifers or peat, is subjected to destructive distillation in the presence of a 4–30 fold excess of, preferably a 6–15 fold excess of air, at a temperature of 400°–1200°C, preferably 600°–1000°C, to form smoke. The obtained smoke is condensed either thermally, gravitationally or in an electrostatic field, or by adiabatic expansion. A combination of one or more of these measures, e.g., gravitational condensation plus thermal condensation or gravitational condensation plus electrostatic condensation is of advantage. This has the advantage that in addition to the increased yield of the product, contamination of the atmosphere with smoke constituents is avoided. The obtained condensate is then subjected to fractionation, utilizing the selective ability of the components of the smoke to electrolytic dissociation i.e. the various values of the dissociation constant of these components and also the capabilities of some components to form salt-type compounds dependent on the pH of the medium, and also utilizing the solubility of non-dissociated smoke-components and/or compounds liberated from salt-type compounds in organic, water-immiscible solvents.

From the condensate, three fractions are isolated which are the components of the agent according to the invention. The fractionation comprises alkalizing the condensate by means of an aqueous solution of a strong base, adjusting the pH-value of the reaction mixture to a convenient level by means of an acid, and extracting the mixture by means of an organic water-immiscible solvent. Then the water phase is separated from the organic phase, and from one of these two phases, the desired fraction is isolated, while the other phase is subjected to further processing. The pH value is adjusted to the appropriate level by adding acid or base and the said fraction is re-extracted with an organic solvent, the fraction being obtained constituting the second component of the agent according to the invention. Proceeding in the same manner, undesired ballast components are separated from the remainder by means of extraction, and from the mixture remaining after the separation of ballast, the third fraction is extracted with an organic solvent, at a convenient pH.

As the strong bases, there are included alkali hydroxides, especially sodium or potassium hydroxide, and as the mineral acids, sulphuric acid, orthophosphoric acid and hydrochloric acid are preferably employed. As the organic water immiscible solvent used in the extractions, preferably diethyl ether or ethyl acetate is used. The solvent which has been used in the extraction may be regenerated in a known manner and then returned to the process.

The first extraction of the smoke condensate is performed at a pH of about 10.5, the two phases are separated, and the organic phase is alkalized to a pH of about 12.8, again extracted and the phases are separated, then the water phase is adjusted to a pH of about 10.5 with acid, and again extracted, the phases are separated, and after evaporation of the solvent from the organic phase, fraction No. 1 is obtained, constituting the first component of the agent according to the invention. This fraction contains mainly phenol-compounds of a molecular weight of above 140 and is of a very thick chocolate-colored honey-consistency. The organic phase obtained as a result of the extraction at a pH of about 12.8 is subjected to distillation under reduced pressure, whereby fraction No. 2 is obtained constituting the second component of the agent according to the invention. This fraction has a boiling point of up to 220°C. under a 10 mm Hg pressure and is mainly composed of compounds which, in a medium having a pH of about 12.8, do not form salt-type bonds. Its consistency is that of a thin, slightly blood-red, shiny very dark amber colored syrup.

The water phase separated from the organic phase after the first extraction at a pH of about 10.5 is acidified to a pH of about 5 and extracted with an organic solvent which dissolves low-molecular weight phenols, phenolic-acids and tannins which constitute undesired ballast and which is discarded. The water layer separated after the extraction at a pH of about 5 is acidified to a pH of about 3, and then it is extracted. The organic phase is separated, and after evaporation of the solvent, fraction No. 3 is obtained being the third component of the agent according to the invention.

This third fraction contains lower carboxylic acids, particularly acetic acid, formic acid, propionic acid, valeric acids etc. Its consistency is that of a thin, somewhat viscous, slightly yellowish liquid and it has a keen scent of vinegar and setwall.

Fractions No. 1 and No. 2 are substantially immiscible with water, whereas fraction No. 3 is soluble in water.

In order to obtain a finished agent according to the invention, the above mentioned three fractions, or any two thereof are mixed together in a convenient ratio or single fractions are used, depending on the expected use of the agent. To obtain an agent for aromatizing articles of food, e.g. meat products, fish, cheese or quality spirits, as well as animal feeds and similar products, fractions No. 1, No. 2 and No. 3 are mixed together in a weight ratio of 1:0.1–0.4:0–0.2. In order to obtain an agent essentially designed only as an antiseptic, fraction No. 1 and fraction No. 3 are mixed together in a ratio by weight of 1:0.2–0.5; and for obtaining an agent to be used as an antioxidant, fraction No. 1 is mixed with fraction No. 3 in a ratio by weight of 1:0.0–0.2.

Considering the high activity of the agent according to the invention and the resulting necessity of using it depending on its destination, in amounts from several to several hundred parts by weight per million of parts by weight of the product, dilution of the agent by means of a carrier or diluent is necessary. As the carrier, any substance which may safely be used in articles of food, animal feed etc. are employed; the carrier being a solvent for the agent according to the invention being used, if necessary. Such carrier-solvents are e.g. ethyl alcohol, ethylene glycol, glycerol, animal or vegetable fats, or a mixture thereof. Another type of carrier is e.g.: domestic salt, starch, spices, fluxes, curing mixtures etc., which are saturated with the agent according to the invention.

It is also possible to use the agent according to the invention in the form of an emulsion e.g. emulsion in water, in curing brines etc.

Depending on the ultimate use, preparations containing 10–20% by weight of the agent according to the invention and 80–90% by weight of the carrier, are produced. These preparations are eventually diluted directly before use, e.g. preparations in the form of solutions of the agent according to the invention are advantageously diluted to a concentration of about 2% by weight.

If the carrier to be used is a substance which is a good solvent of the agent according to the invention, e.g. ethyl, alcohol, ethylene glycol, glycerol or fats, the completed preparation in the form of a solution is obtained by simply mixing the agent with the carrier, possibly heating to a temperature of about 50°–100°C. With solid carriers, the agent is combined with the carrier by rubbing the mixture in a ball mill, mixer or crusher. Preparations in the form of emulsions are produced in known emulsifying devices, especially with the utilization of ultrasonics.

When mixing the agent with the carrier it is sometimes of advantage to add about 5–25% by weight of ethyl alcohol in relation to the carrier mass and after mixing with the carrier to evaporate the ethyl alcohol under a pressure of about 10 mm Hg, heating the whole mass to a temperature of 50°–100°C, for the purpose of removing possible traces of the organic solvent used for the extraction.

The invention is more fully explained in the following examples which do not limit its scope.

EXAMPLE I 100 kg of air-dry softwood sawdust are glowed with air access at 690°–980°C and the smoke obtained is deposited in an electrostatic filter operating at an effective voltage of 40 kV, the output of the filter being 75% by weight of organic components of the smoke aerosol. The smoke condensate obtained is subjected to sedimentation and 10 kg of tarry smoke components are obtained. This product is emulsified with 50 kg of a 2% potassium hydroxide aqueous solution, the pH-value of the emulsion is corrected to 10.5 by means of concentrated sulphuric acid and then extraction is performed by means of ethyl acetate which has been used in an amount quantitatively equal to that of the solution. After emulsion breaking, the water phase is acidified with sulphuric acid to a pH-value of 5, then is emulsified again with quantitatively the same ethyl acetate portion and after emulsion breaking, the phases are separated from one another. The organic phase containing undesired ballast components is rejected and the water phase is acidified with sulphuric acid to a pH of 3 and extracted with the aid of ethyl acetate. After separation of the phases the water phase is rejected and from the organic phase the solvent is evaporated, obtaining as the residue the fraction No. 3 of the agent according to the invention, containing carboxylic acids.

The smoke components extracted by means of a solvent during the first extraction of the solution of a pH-value of 10.5, are emulsified with 25 kg of a potassium hydroxide aqueous solution to obtain a reaction medium of pH 12.8 and after emulsion breaking, separation of phases and evaporation of the solvent from the organic phase, the remainder is subjected to distillation under a pressure of 10 mm Hg and one separates the fraction to boiling temperature of 220°C. This is the fraction No. 2 of the agent according to the invention, containing compounds which do not form salts in a reaction medium having a pH-value of 12.8.

The alkaline aqueous solution, from which the compounds constituting fraction No. 2 have been removed, is acidified with sulphuric acid to a pH-value of about 10.5 and the released phenols are extracted with ethyl acetate. From the ethyl acetate solution the solvent is evaporated and fraction No. 1 of the agent according to the invention is obtained. The yield of the individual fractions is as follows: fraction No. 1 — 1 kg, fraction No. 2 — 0.4 kg and fraction No. 3 — 0.2 kg. By mixing these fractions with one another in a convenient ratio, the finished agent according to the invention is obtained which is then mixed with the carrier.

EXAMPLE II

The smoke produced in a manner as stated in Example I, is preliminarily cooled to room temperature and then it is deposited in a tandem consisting of a centrifugal separator producing a gravitation field of $2 \times 10^4 \times$ g and a cascade cyclone.

The obtained condensate is heated to 80°C and by means of a centrifugal separator the tarry components are separated. 8 kg of tarry product is obtained which continues to be processed in a manner as stated in Example I, obtaining 0.75 kg of fraction No. 1, 0.3 kg of fraction No. 2 and 0.15 kg of fraction No. 3.

EXAMPLE III

The smoke obtained in the manner as described in Example I, is cooled to room temperature and is condensed in a multisection sedimentation chamber the walls of which are cooled to + 1°C. The gathered condensate is heated to 90°C and is left in the settling tank for separation of the layers. The isolated tarry product is further processed in a manner as described in Example I but with the difference that for alkalization an aqueous sodium hydroxide solution with equivalent concentration is used, and as the mineral acid, orthophosphoric acid is employed, and as the solvent-diethyl ether. The yield of the individual fractions of the agent according to the invention approaches very nearly that as obtained in Example II.

EXAMPLE IV

The smoke produced in a manner as stated in Example I, but with the use of peat instead of wood, is compressed to 35 atm pressure and cooled to 1°C, whereupon it is expanded to atmospheric pressure. The condensate obtained is separated into layers by means of a centrifugal separator and the tarry product is further processed in a manner as described in Example I, but using hydrochloric acid as the mineral acid. The yield of the individual fractions of the agent according to the invention approaches that as stated in Example I.

EXAMPLE V

The fractions of the agent according to the invention obtained in Example I, are mixed with one another in the following amounts by weight: fraction No. 1 — 1 kg, fraction No. 2 — 0.25 kg, fraction No. 3 — 0.05 kg, whereupon 1 kg of ethyl alcohol /rectified spirit 96%/ is added, then the mixture is thoroughly stirred heating with steam to 50°C and flooded with 8.7 kg of lard, previously heated to 60°C. The mixture is transferred into a vacuum evaporator operating at the following parameters.

Heating steam temperature: 105°C, pressure: 10 mm Hg and the alcohol distillation is led up to the moment at which the temperature of the mixture reaches 90°C. The product obtained is poured in a hot state into containers and is sent to the user who heats it to the working temperature of 45°C and mixes it with a fourfold amount of lard heated also to 45°C.

The agent thus obtained is used above all for canned meat and sausages, especially steamed ones.

EXAMPLE VI

Fractions of the agent obtained according to the invention in Example III are mixed with one another in the following amounts by weight: fraction No. 1 — 1 kg, fraction No. 2 — 0.3 kg, fraction No. 3 — 0.15 kg, whereupon 1 kg of ethyl alcohol /96% rectified spirit/ is added, the mixture is heated to 50°C, throughly stirred and mixed with 8.55 kg of cooking salt /table salt/, the mass is rubbed in a crusher and the product obtained is poured into a vacuum mixer containing 40 kg of cooking salt /table salt/ and the mixture is thoroughly stirred for 60 minutes at a pressure of 10 mm Hg. The product obtained is a 2% solution of the agent according to the invention brought upon cooking salt, designed above all to sausages, especially fermented sausages, fish etc.

EXAMPLE VII

Fractions of the agent according to the invention, obtained in Example II, are mixed with one another in the following amounts by weight: fraction No. 1—1 kg, fraction No. 2 —0.4 kg, whereafter 1 kg of ethyl alcohol is added and the mixture is thoroughly stirred while raising its temperature to 50°C, whereupon 8.6 kg of butter previously dehydrated and heated to 60°C is added. The mixture is then brought into a vacuum evaporator described in Example V and operating at the same parameters. The product obtained is used above all in dairy and cheesemaking industries, where it is diluted with a fourfold amount by weight of butter with thorough stirring.

EXAMPLE VIII

Fractions of the agent according to the invention obtained in Example 4, are mixed with one another in the following amounts by weight: fraction No. 1 — 1 kg, fraction No. 2 — 0.15 kg are thoroughly mixed with one another, 0.05 kg of an emulsifier /lecithin/ is added and the mixture is mixed in the emulsifier with 8.7 kg of a pumping brine. The emulsion obtained is used above all in the production of large meat or fish elements intended to acquire features of smoked products, e.g. of ham, salmon.

EXAMPLE IX

The agent obtained as in Example V is introduced in an amount of 2 kg of a 2% solution into a sausage mix containing one ton of sausage-meat, in the meat mixing phase. The other sausage production phases remain unchanged with the exception that instead of smoking, the product put into the casing is subjected to heat only, without any smoke.

EXAMPLE X

The agent obtained as in Example VII, except that instead of butter, fish liver oil was used, is introduced into the oily infusion, produced on vegetable oils and-/or fish liver oil basis, in the ratio by weight as: 2% of the solution of the agent in fish liver oil to oily infusion = 1:20, whereupon it is carefully stirred and the infusion thus prepared is introduced by means of a feeder into cans in which fish is already placed. The further technological operations remain without any change except that the fish was not smoked but optionally only steamed.

EXAMPLE XI

The agent obtained as in Example I is introduced in an amount of 0.5 kg of a 2% solution of the agent per 1 ton of meat, into meat designed for preserves or canned ham. In case of comminuted meat /e.g. luncheon meat, chopped pork, minced ham/ the agent is added in the comminuting phase on the cutter or in the mixing phase, whereas in case of great lumps of meat the agent is added by pumping it with brine either in the form of a mixture with domestic salt in the mixing phase or while the meat is being mechanically processed. The further technological operations remain without any change. The aim of the addition of the agent is the synergistic action emphasizing the natural aroma of the product and covering the after-tastes arising during pasteurization or sterilization.

EXAMPLE XII

The agent obtained as in Example VII, except that it contains only fraction 1 of the agent according to the invention, is added to butter to prevent autoxidation processes /rancidity/, in an amount of 0.75 kg of a 2% solution of the agent in butter per 1 ton of butter. Adding takes place in the mixing phase prior to formation. Further production operations remain without any changes.

EXAMPLE XIII

The agent obtained as in Example I, except that it contains only fraction No. 1 of the agent according to the invention, is added to lard to prevent rancidity, in an amount of 1.25 kg of a 2% solution of the agent in lard per 1 ton of lard, while mixing prior to formation.

EXAMPLE XIV

The agent obtained as in Example VI, is added to sausage meat to control the fermentation process /salami, cervelate/, in an amount of 4 kg of a 2% solution of the agent per 1 ton of salami or cervelate sausage-meat. The further processes are without any changes, except the smoking process which is replaced by a drying process.

EXAMPLE XV

The agent obtained as in Example VIII, except that it contains only fraction No. 1 and fraction No. 3 in a ratio by weight of 1:0.10 is added to cultures of microorganisms (lactic acid bacteria) to inhibit the growth of undesired strains. The addition of a 2% emulsion of the agent amounts to 0.5 kg per ton of culture.

EXAMPLE XVI

The agent obtained according to Example V is added to feed for breeding animals (swine or cattle) to obtain greater weight increase, using 2.5 kg of a 2% solution of the agent in lard per ton of feed. Such a feed affords the possibility of obtaining per unit time, weight increases which are higher by an amount of 2.5% than in the case of animals fed with a feed without the addition of the present agent.

EXAMPLE XVII

The agent obtained in Example I and used in feeds in the amounts stated in Example XVI, when given to fur-bearing animals improves the quality of their furs after as little as 3 months.

EXAMPLE XVIII

The agent prepared in Example V and used as in Examples XVI and XVII decreases the liability of animals to neoplasms about twofold, i.e., the ratio of the number of new growths in the control group to the number of new growths in the group of animals fed with the agent was 17:7 with practically the same initial population of 125 animals.

What is claimed is:

1. A method of producing an aromatizing and/or antiseptic and/or oxidation agwnt comprising destructively distilling a cellulosic or lignin material obtained from wood or peat in the presence of a 4–30 fold excess of air at a temperature of 400°–1200°C. to form smoke, condensing the smoke to form a condensate, treating the condensate with an aqueous solution of a strong base to raise the pH to about 10.5, extracting the condensate with a water-immiscible organic solvent separating first aqueous and first organic phases raising the pH of the first organic phase to about 12.8 with a strong base and extracting with a water immiscible solvent to form two phases which are a second aqueous and second organic phase treating the second aqueous phase with a mineral acid to lower the pH to about 10.5, extracting said second aqueous phase with a water-immiscible solvent to form two phases which are a third aqueous and third organic phase, evaporating the solvent from the third organic phase, to obtain the first fraction, evaporating the solvent from the second organic phase to obtain a residue, distilling said residue under reduced pressure to obtain the second fraction which boils at temperatures up to 220°C. at a pressure of 10 mm Hg; acidifying the first aqueous phase with mineral acid to a pH of about 5, extracting said first aqueous phase with a water-immiscible solvent to form two phases which are a fourth aqueous and fourth organic phase, acidifying said fourth aqueous phase to a pH of about 3 and extracting same with a water-immiscible solvent to form two phases which are a fifth aqueous and fifth organic phase, and evaporating the solvent from the fifth organic phase to obtain the third fraction.

2. A method as claimed in claim 1 wherein the cellulosic or lignin material is destructively distilled at 600°–1000°C.

3. A method as claimed in claim 1 wherein the air is present in a 6–15 fold excess.

4. A method as claimed in claim 1 wherein the strong base is an alkali hydroxide, and the mineral acid is sulphuric acid, orthophosphoric acid or hydrochloric acid and the water immiscible organic solvent is diethyl ether or ethyl acetate.

5. A method as claimed in claim 4 wherein the alkali hydroxide is sodium hydroxide or potassium hydroxide.

6. A method as claimed in claim 1 further comprising mixing at least one of the fractions with a carrier, having a boiling point higher than ethyl alcohol, adding to the mixture of of fractions and carrier 5–25% by weight based on the carrier of ethyl alcohol and thereafter evaporating off the ethyl alcohol at a temperature of about 50°–100°C. at a pressure of 10 mm Hg to remove traces of water-immiscible solvent used in the extractions.

7. A method comprising administering to farm animals a mixture of an animal feed and several parts to several hundred parts per million parts of animal feed of the agent as claimed in claim 6 to increase the rate of weight gain of said form animals per unit time.

8. A method as claimed in claim 7 wherein the three fractions are present in the agent in a weight ratio of 1:0–0.4:0–0.2.

9. A composition comprising a food or an animal feed and several parts to several hundred parts by weight per million parts of said food or animal feed of the agent as claimed in claim 6.

10. A composition as claimed in claim 9 wherein the three fractions are present in the agent in a weight ratio of 1:0–0.4:0–0.2.

11. An agent which comprises at least one of the fractions obtained by the method of claim 1.

12. A composition which comprises a solution of the agent as claimed in claim 11 in a liquid carrier comprising at least one member selected from the group consisting of ethyl alcohol, ethylene glycol, glycerol, an animal fat and a vegetable fat.

13. A composition which comprises a mixture of the agent as claimed in claim 11 with a solid carrier comprising at least one member selected from the group consisting of domestic salt, starch, spices, fluxes and solid curing mixtures for foodstuffs.

14. A composition which comprises an emulsion of the agent as claimed in claim 11 in water or a curing brine for foodstuffs.

* * * * *